UNITED STATES PATENT OFFICE.

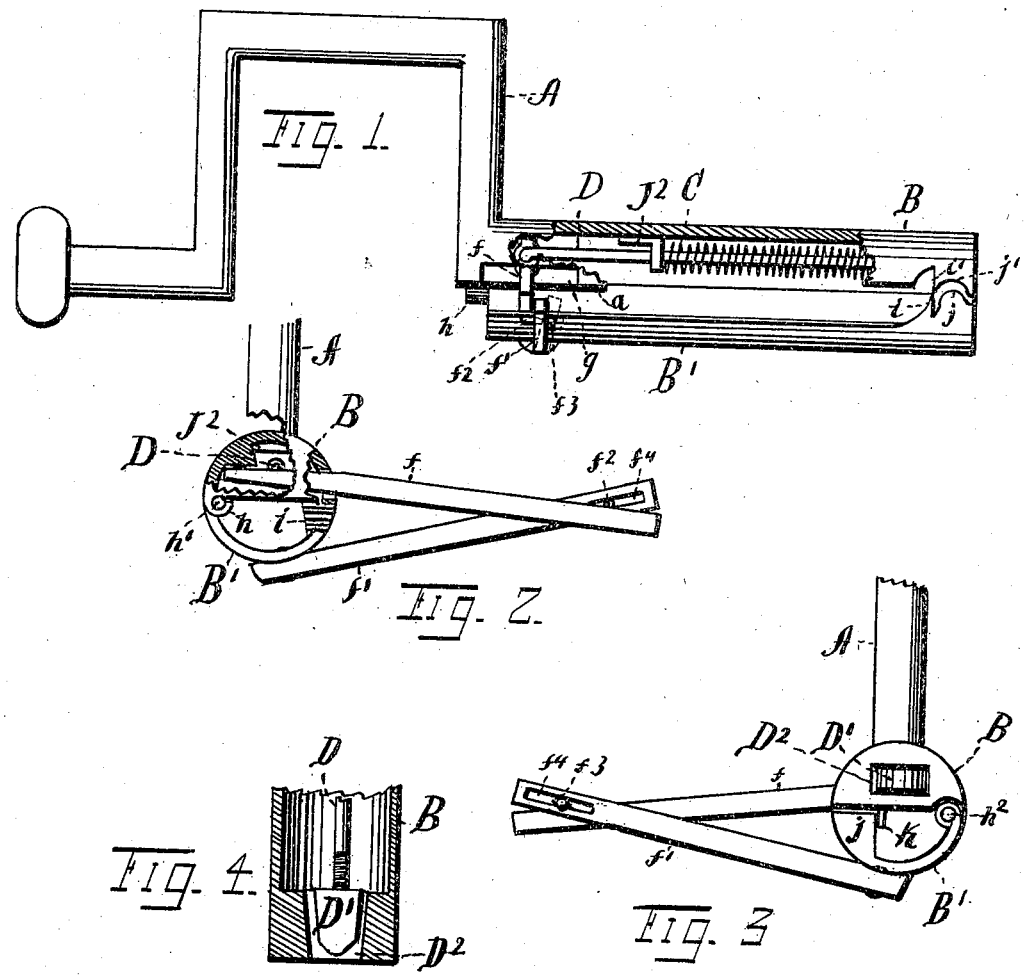

GEORGE SCHUBERT, OF WALNUT SPRINGS, TEXAS.

METAL-BANDING OR BALE-WIRING TOOL.

SPECIFICATION forming part of Letters Patent No. 503,257, dated August 15, 1893.

Application filed February 20, 1893. Serial No. 462,947. (No model.)

*To all whom it may concern:*

Be it known that I, GEORGE SCHUBERT, a citizen of the United States, residing at Walnut Springs, in the county of Bosque and State of Texas, have invented certain new and useful Improvements in Metal-Banding or Bale-Wiring Tools; and I do hereby declare the following to be a full, clear, and exact description of the invention, such as will enable others skilled in the art to which it appertains to make and use the same, reference being had to the accompanying drawings, forming part of this specification, in which drawings—

Figure 1 is a view of the tool partly closed with a part of the shank broken away. Fig. 2 is a top plan view of same with some parts broken away. Fig. 3 is a bottom plan view; and, Fig. 4 is a sectional view of a lower part of the tool.

This invention relates to a banding or bale wiring tool, especially adapted to be inserted in between the bars of a baling press, to grasp and cut the wire, after said wire has been firmly drawn around the bale, and twist the two ends of the wire together to form a tie.

My object in this improvement is: to construct a tool of the kind named; and the simplest plan possible, to be low of production and easy to operate.

Referring to the drawings: the shank of this tool is formed of two halves B, and B' concaved or hollowed out to provide room for the mechanism hereinafter described. On the upper end of the half B can be formed a sweep A, as shown, to rotate the shank. The half B' is hinged to the half B by the hinges $h'$ and $h^2$ formed in any suitable and well known manner.

$f$ designates a lever extending through a slot $g$, in near the upper end of the half B, and pivoted with its end to near the opposite side of the half B, and perforated a short distance from its pivoted end to receive the rod D. Said lever $f$ has a vertical movement in the slot $g$, to operate the plunger D'.

$f'$ designates a similar lever pivoted to the half B' in position to pass beneath the lever $f$ as shown in Fig. 1, and having its free end slotted $f^4$, to receive the stud $f^2$. The lower end of the half B is left solid, with a perforation, as shown, therein.

D' is a wedge shaped plunger to fit in said perforation $D^2$.

D designates a rod connecting the plunger D' to the lever $f$.

$J^2$ is a bracket forming a guide for the rod D, and an abutment for the upper end of the spring C. The other end of the spring C rests on the plunger D'.

$j$ is a convex and $j'$ is a corresponding concave on the lower end of the tool forming a clamp, and $i$ and $i'$ are jaws forming cutting edges to cut and clamp the wire. Said shears and clamps $j$ and $j'$ can be extended clear across to lower end of the tool.

$k$ is a stud on the rear end of the shears and clamps, to prevent the wire from shifting beyond the shears and clamps where they are not extended clear across the tool, (as in the present instance.)

$h$ is a projection forming the upper hinge $h'$.

The lower end of the plunger rod D is threaded and screwed in the plunger D' so that the length of the rod D can be adjusted to carry the lever $f$ at near a right angle with the shank while using large or small wire.

The parts are constructed to operate as follows, viz: The wire is placed around the bundle or bale, and the plunger D' elevated and the end of the wire is inserted in the perforation $D^3$ and the plunger D' released to clamp said wire. Then the wire from the reel is firmly drawn around the bale, and placed in the clamp and shears and the levers $f$ and $f'$ are pressed toward each other to cut and clamp the wire, and the lever $f$ is shifted over the stud $f^2$, after which the tool is rotated to form a tie in the wire. The stud $f^2$ is secured adjustable by a nut $f^3$ in the slot $f^4$ thus adapting the tool for different size of wires.

Having thus described my invention, what I claim is—

1. The combination in a banding or bale wiring tool, formed of a shank, formed of two halves, a sweep formed on the upper end of one of said halves, a perforation $D^2$ in the lower end of one of said halves, a plunger within said perforation, a spring C on the plunger-rod D, clamping jaws $j$ and $j'$, and cutting jaws $i$ and $i'$ near the lower end of the shank levers $f, f'$, a stud in one of said levers for the purpose described.

2. The combination in a banding or bale wiring tool, formed of a shank of two halves, a perforation $D^2$ in the lower end of the shank, a rod D pivoted to the lever $f$ and adjustably secured in the plunger $D'$, a spring C on said rod, D, a slot $g$, as shown, clamping jaws $j$ and $j'$, and cutting jaws $i$ and $i'$, levers $f$ and $f'$, a stud in one of said levers, means to rotate said shank for the purpose described.

3. The combination in a banding or bale wiring tool, formed of a shank of two halves, a perforation $D^2$ in the lower end of the shank, a rod D pivoted to the lever $f$ and adjustably secured in the plunger $D'$, a spring C on said rod D, a slot $g$, as shown, clamping jaws $j$ and $j'$, and cutting jaws $i$ and $i'$, levers $f$ and $f'$, a slot $f^4$ in the free end of one of said levers, a stud $f^2$ secured adjustably in said slot $f^4$, means to rotate said shank as and for the purpose described.

In testimony whereof I have affixed my signature in presence of two witnesses.

GEORGE SCHUBERT.

Witnesses:
  W. C. JONES,
  GUS BARRY.